United States Patent
Dederer et al.

(10) Patent No.: US 10,236,086 B2
(45) Date of Patent: Mar. 19, 2019

(54) ALTERNATE PASSIVE SPENT FUEL POOL COOLING SYSTEMS AND METHODS

(71) Applicant: WESTINGHOUSE ELECTRIC COMPANY LLC, Cranberry Township, PA (US)

(72) Inventors: Jeffrey T. Dederer, Valencia, PA (US); William L. Brown, Pittsburgh, PA (US); Frank Vereb, Coraopolis, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 228 days.

(21) Appl. No.: 15/274,761

(22) Filed: Sep. 23, 2016

(65) Prior Publication Data

US 2017/0011813 A1    Jan. 12, 2017

Related U.S. Application Data

(62) Division of application No. 13/760,263, filed on Feb. 6, 2013, now Pat. No. 9,646,726.

(51) Int. Cl.
 *G21C 19/07* (2006.01)
 *G21C 15/18* (2006.01)
 *G21D 3/06* (2006.01)

(52) U.S. Cl.
 CPC .............. *G21C 19/07* (2013.01); *G21C 15/18* (2013.01); *G21D 3/06* (2013.01); *G21Y 2002/207* (2013.01); *Y02E 30/40* (2013.01)

(58) Field of Classification Search
 CPC ............ G21C 19/07; G21C 19/40; G21F 5/10
 See application file for complete search history.

(56) References Cited

U.S. PATENT DOCUMENTS

| 2,993,852 A | 7/1961 | Christy |
| 3,808,446 A | 4/1974 | Sidebotham et al. |

(Continued)

FOREIGN PATENT DOCUMENTS

| EP | 2 518 731 A2 | 10/2012 |
| JP | H06294891 A | 10/1994 |

(Continued)

OTHER PUBLICATIONS

European Patent Office, Extended European Search Report for European Application No. 13876854.4, dated Aug. 10, 2016.

*Primary Examiner* — Sharon M Davis
(74) *Attorney, Agent, or Firm* — Joseph C. Spadacene; Westinghouse Electric Company LLC

(57) ABSTRACT

The present invention relates to passive cooling systems and methods for cooling a spent fuel pool in a nuclear power plant in the absence of onsite and offsite power, e.g., in a station blackout event. The systems include a gap formed along the periphery of the spent fuel pool, a heat sink, one or more thermal conductive members, a water supply system for delivering water to at least partially fill the gap and conduct heat generated from the spent fuel pool through the gap to at least one thermal conductive member for transporting heat to the heat sink, and a thermal switch mechanism for activating and deactivating the water supply system.
In particular, the passive spent fuel pool cooling systems and methods of the invention are useful when the active spent fuel pool cooling system is unavailable or inoperable.

6 Claims, 4 Drawing Sheets

(56) References Cited

U.S. PATENT DOCUMENTS

| | | | |
|---|---|---|---|
| 4,240,875 A | * | 12/1980 | Katscher ............... G21C 9/016 376/280 |
| 4,404,165 A | | 9/1983 | Hesky et al. |
| 5,078,958 A | | 1/1992 | Danko et al. |
| 5,699,394 A | | 12/1997 | Schreiber et al. |

FOREIGN PATENT DOCUMENTS

| | | |
|---|---|---|
| JP | 2001 091684 A | 4/2001 |
| JP | 2001 296387 A | 10/2001 |
| JP | 2009 063466 A | 3/2009 |
| JP | 2012 207917 A | 10/2012 |
| JP | 2012255870 A | 11/2012 |

\* cited by examiner

ALTERNATE PASSIVE SPENT FUEL POOL COOLING SYSTEMS AND METHODS

CROSS REFERENCE TO RELATED APPLICATION

This application is a divisional application of U.S. Ser. No. 13/760,263, filed on Feb. 6, 2013, entitled ALTERNATE PASSIVE SPENT FUEL POOL COOLING SYSTEMS AND METHODS, and claims priority thereto.

FIELD OF THE INVENTION

The present invention relates generally to alternate passive cooling systems and methods for spent fuel pools in nuclear reactor power plants and in particular, to a mechanism for cooling a spent fuel pool in the event of a loss of the normal active spent fuel pool cooling system which can occur as a result of a loss of onsite and offsite power.

BACKGROUND

A nuclear reactor power plant generates electric power as a result of the nuclear fission of radioactive materials contained within the nuclear reactor. Due to the volatility of this nuclear reaction, nuclear reactor power plants are designed in a manner to assure that the health and safety of the public is maintained.

In conventional nuclear reactors, the radioactive material used for generating electric power is nuclear fuel. The nuclear fuel is depleted, i.e., spent, over the life of the fuel cycle. The nuclear fuel is not reprocessed and therefore, the spent fuel is removed at periodic intervals from the nuclear reactor. Even after removal, the spent fuel continues to generate intense heat, called "decay heat," and remains radioactive. Decay heat naturally decreases over time at an exponential rate, but still generates enough energy to require water cooling for several years. Thus, a safe storage facility is needed to receive and store the spent fuel. In nuclear reactor power plants, such as small modular reactors and other pressurized water reactors, a spent fuel pool is provided as a storage facility for the spent fuel following its removal from the reactor. The spent fuel pool is typically constructed of concrete and contains a level of water that is sufficient in order to maintain the nuclear fuel immersed underwater. The spent fuel pool is typically at least 40 feet deep. The quality of the water is also controlled and monitored to prevent fuel degradation in the spent fuel pool. Further, the water is continuously cooled to remove the heat which is produced by the spent fuel in the pool.

A typical nuclear reactor power plant includes an active spent fuel pool cooling system which is designed for and capable of removing decay heat generated by stored spent fuel from the water in the spent fuel pool. "Active" cooling systems include those which require alternating current electric power to operate pumps or valves in order to achieve the desired cooling function. Removal of the decay heat is necessary to maintain the spent fuel pool water temperature within acceptable regulatory limits and prevent unwanted boiling of the water in the spent fuel pool. In some pressurized water reactors, such as the AP1000 design which includes Westinghouse's Passive Core Cooling System, the spent fuel pool cooling system is a non-safety-related system. In other pressurized water reactor designs, such as non-AP1000 designs, the spent fuel pool cooling system is a safety-related system.

The active spent fuel pool cooling system typically includes a spent fuel pool pump to circulate high temperature water from the spent fuel pool and through a heat exchanger to cool the water. The cooled water is then returned to the spent fuel pool. The spent fuel pool cooling system can include two mechanical trains of equipment. Each train having one spent fuel pool pump, one spent fuel pool heat exchanger, one spent fuel pool demineralizer and one spent fuel pool filter. The two trains of equipment can share common suction and discharge headers. In addition, the spent fuel pool cooling system includes the piping, valves and instrumentation necessary for system operation. Typically, one train is continuously cooling and purifying the spent fuel pool while the other train is available for water transfers, in-containment refueling water storage tank purification, or alignment as a backup to the operating train of equipment.

FIG. 1 shows an active spent fuel pool cooling (SFPC) system 10 during its normal operation in accordance with the prior art. The SFPC 10 includes a spent fuel pool 5. The spent fuel pool 5 contains a level of water 16 at an elevated temperature as a result of the decay heat generated by the spent fuel (not shown) that is transferred from the nuclear reactor (not shown) into the spent fuel pool 5. The SFPC system 10 includes trains A and B. Trains A and B are employed to cool the water in the spent fuel pool 5. As previously described, it is typical to operate one of train A or train B to continuously cool and purify the spent fuel pool 5 while the other train is available as a back-up. Each of trains A and B include a SFPC pump 25, a SFPC demineralizer and filter system 45. Trains A and B share a common suction header 20 and a common discharge header 50. In each of trains A and B, water exits the spent fuel pool 5 through the suction header 20 and is pumped through the SFPC pump 25 to the SFPC heat exchanger 30. In the SFPC heat exchanger 30, a flow line 40 passes water from the component cooling water system (CCWS) (not shown) through the SFPC heat exchanger 30 and back to the CCWS. The heat from the water entering the SFPC heat exchanger 30 (from the spent fuel pool 5) is transferred to the water provided by the flow line 40 and is returned back to the CCWS through the flow line 40. Cooled water exits the SFPC heat exchanger 30 and passes through the SFPC demineralizer and filter system 45 positioned downstream of the SFPC heat exchanger 30. Purified, cooled water exits the demineralizer and filter system 45, is transported through the common discharge header 50, and is returned to the spent fuel pool 5.

In addition to the active SFPC system shown in FIG. 1, it is also known in the art to employ passive designs to mitigate accident events in a nuclear reactor without operator intervention or off-site power. These passive designs emphasize safety features that rely on natural forces, such as pressurized gas, gravity flow, natural circulation flow, and convection, and do not rely on active components (such as, pumps, fans or diesel generators). Further, passive systems are designed to function without safety grade support systems (such as, AC power, component cooling water, service water, and HVAC). A passive spent fuel pool cooling system can be designed such that the primary means for spent fuel protection is provided by passive means and relies on the boiling of the spent fuel pool water inventory to remove decay heat.

For example, if a complete loss or failure of an active spent fuel pool cooling system is assumed, spent fuel cooling can be provided by the heat capacity of the water in the spent fuel pool. The decay heat of the spent fuel is transferred to the water in the pool and, after some period of time, causes the water to boil. The boiling action of the pool water produces non-radioactive steam, which transfers the decay heat energy to the atmosphere. After a specific period of time, additional water will need to be added to the SFP to makeup for the loss of inventory due to boiling. Water make-up can be provided to the spent fuel pool by alternate means to maintain the pool water level above the top of the spent fuel and boiling of the pool water can continue to provide for the removal of decay heat. Boiling of the spent fuel pool water releases large quantities of steam into the fuel handling area. The steam mixes with air in the fuel handling area to form a steam/air mixture which is then passively vented through an engineered relief panel to the atmosphere to reduce the temperature in the fuel handling area.

The boil-off rate of the spent fuel pool water is highly dependent on the decay heat generated by the fuel in the pool. The amount of decay heat generated depends on how recently fuel has been offloaded into the spent fuel pool. During the first 72 hours of a loss of cooling event, water is typically supplied from safety-related sources, such as the spent fuel pool inventory, water stored in the cask washdown pit, and water from the fuel transfer canal. If additional makeup water is required beyond 72 hours, water from the passive containment cooling system ancillary water storage tank can be provided to the spent fuel pool.

The invention provides an alternate passive spent fuel cooling system and method that is employed to remove decay heat generated by the spent fuel in the event of a loss of onsite and offsite power wherein the active spent fuel pool cooling system is not available to cool the spent fuel pool.

SUMMARY OF THE INVENTION

In one aspect, the invention provides a passive cooling system for a spent fuel pool in a nuclear power plant to provide cooling in the absence of onsite and offsite power. The system includes a gap having a first side and a second side formed at least partially along a periphery of the spent fuel pool, a heat sink, one or more thermal conductive members having a first end connected to the second side of the gap and a second end connected to the heat sink wherein the one or more members are structured to transport heat from the gap to the heat sink, a water supply system including a water source and a discharge header having a first end connected to the water source and a second end connected to the gap, and a thermal switch mechanism having an activate position and a deactivate position which is structured to deliver water from the water system into the gap when in the activate position and structured to inhibit the release of water from the water system into the gap when in the deactivate position. When the thermal switch mechanism is in the activate position, heat generated in the spent fuel pool is conducted through the gap by the water therein and transported through the one or more conductive members to the heat sink.

In certain embodiments, the passive cooling system can include one or more conductive cooling fins attached to the second end of the one or more members to enhance transfer of decay heat from the members to the heat sink.

Further, the passive cooling system can include a valve located in the discharge header and structured to be positioned in the open position to allow the flow of water in the gap and in the closed position to inhibit the flow of water in the gap.

Furthermore, the passive cooling system can be incorporated in a nuclear power plant containing a pressurized water reactor.

In certain embodiments, the first side of the gap can be formed by a spent fuel pool liner. The second side of the gap can be formed by a concrete wall. The gap can be continuous or the gap can be partitioned into a plurality of channels.

In certain embodiments, the discharge header is located at the top or near the top of the gap. Wherein the gap is partitioned into a plurality of channels, each of the channels can have a discharge header located therein.

Moreover, the thermal switch can activate in response to a loss of offsite power event with or without availability of emergency diesels operable to supply AC electrical power to active spent fuel pool cooling pumps. Further, the thermal switch can activate in response to a station blackout when all backup sources of DC electrical power are exhausted.

In certain embodiments, the heat sink can be selected from the group consisting of a mass of earth, a mass of concrete or other material used in foundations or floors of spent fuel pool structures and combinations thereof-.

In another aspect, the invention provides a method of passively cooling a spent fuel pool in a nuclear power plant in the absence of onsite and offsite power. The method includes forming a gap having a first side and a second side at least partially along a periphery of the spent fuel pool, obtaining a heat sink, at least partially filling the gap with water, conducting heat from the spent fuel pool through the at least partially water-filled gap, and transporting the heat from the gap to the heat sink.

In certain embodiments, the gap is at least partially filled with water by discharging water from a water source through a discharge header and into the gap. The discharge header can include a means of controlling the flow of water. The means can include a valve which has an open and closed position.

The first side of the gap can be the liner of the spent fuel pool and the second side of the gap can be the concrete wall of the spent fuel pool. The gap can be partitioned into a plurality of channels. Each of the channels can include a discharge header for delivering water thereto.

In certain embodiments, the method includes transporting heat from the gap to the heat sink by obtaining at least one thermal conductive member, one end being connected to the second side of the gap and another end being connected to the heat sink, conducting the heat through the air gap, transporting the heat through the at least one thermal conductive member and to said heat sink

DETAILED DESCRIPTION OF THE INVENTION

Figure 1:
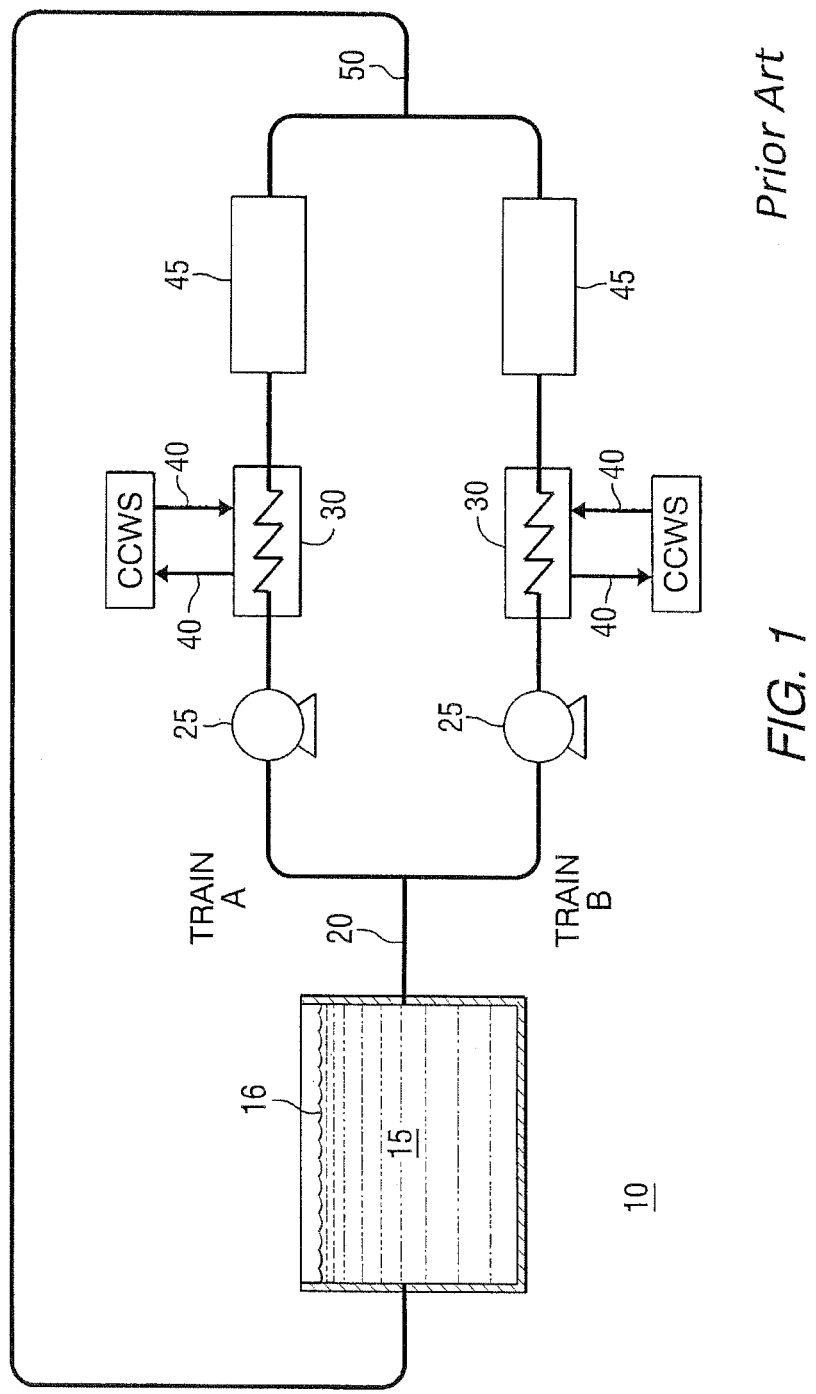
FIG. 1 shows, schematically, a typical active spent fuel pool cooling system in accordance with the prior art.

The invention relates to passive systems and methods for cooling a spent fuel pool in a nuclear reactor power plant including designs such as small modular reactors, other pressurized water reactors and boiling water reactors. In particular, the passive systems and methods of the invention are employed in the event of a loss of the normal active spent fuel pool cooling system which can occur as a result of the loss of onsite and offsite power, e.g., a station blackout.

The invention includes employing a heat sink for removing decay heat from the spent fuel pool. The heat sink can include a wide variety of materials that can absorb heat, such as soil/dirt, filler, such as rock or concrete, and combinations thereof. In certain embodiments, the heat sink is a mass of earth, a mass of concrete or other material used in foundations or floors of spent fuel pool structures and combinations thereof. In response to a station blackout event, decay heat is removed from the spent fuel pool and transferred to the heat sink. The heat sink is located in relative close proximity to the spent fuel pool. In a typical nuclear reactor power plant design, the design and architecture of the spent fuel pool and surrounding structures may preclude the use of the area immediately surrounding, e.g., adjacent to, the spent fuel pool, as a heat sink. Thus, there may be a need to provide a means of transporting the heat removed from the spent fuel pool to the heat sink. The means of transportation can vary. In certain embodiments, the heat is transported using one or more highly thermal conductive members, such as heat pipes. Further, during normal operation, a mechanism is needed to prevent the transport of heat from the spent fuel pool to the heat sink such that the heat sink remains cool during normal operation and, is available and capable of serving as a heat sink during an event, such as station blackout.

In the invention, the inside surface of the spent fuel pool wall is modified to provide a gap along at least a portion of the periphery of the spent fuel pool, forming an inner spent fuel pool wall and an outer spent fuel pool wall. Thus, one side of the gap is formed by the inner spent fuel pool wall and the other side of the gap is formed by the outer spent fuel pool wall. The inner spent fuel pool wall can be formed by an inner stainless steel liner and the outer spent fuel pool wall is typically constructed of concrete, such as steel-lined reinforced concrete. The width and depth of the gap can vary. The area located beyond (e.g., on the outside of) the outer spent fuel pool wall can be used as the heat sink.

During normal operation of the nuclear reactor power plant, the gap contains air to impede the conductive flow of heat from the spent fuel pool. However, in the event of an emergency, such as a station blackout, the gap can be at least partially filled with water. Water is more conductive than air, e.g., approximately 20 times more conductive. Thus, the heat is conducted from the spent fuel pool and into the at least partially water-filled gap.

The water can be supplied to the gap using various conventional systems and methods. In certain embodiments, a water source is attached to a discharge header or manifold which is connected to the outer wall of the spent fuel pool and discharges/empties into the gap. The water source can be in various forms, such as a tank or reservoir. The discharge header can include a fail-safe passive valve, such as an air-operated solenoid valve. During normal operation, the valve can be closed in order to prevent water from flowing into the gap and to inhibit the transfer of heat through the thermal conductive members. In the event of a loss of power, e.g., station blackout, the valve can open (e.g., fail open) using stored energy, typically in the form of a compressed spring, to allow water from the water source to flow through the discharge header and empty into the gap. In turn, the thermal conductive members are activated to transport heat from the gap to the heat sink.

In certain embodiments, the gap is a continuous structure along the periphery of the spent fuel pool. In other embodiments, the gap can be partitioned into a plurality of channels. In accordance therewith, the header can extend continuous around the periphery of the spent fuel pool or the header can correspond to channels formed within the gap such that a header is positioned within each channel. The header typically is positioned at or near the top of the gap.

During the emergency event, heat is removed from the spent fuel pool and conducted across the gap to the thermal conductive members, such as, for example, heat pipes. The outer spent fuel pool wall, e.g., concrete wall, for example, steel-lined reinforced concrete, of the gap provides the attachment point for the thermal conductive members. These conductive members can penetrate through the outer spent fuel pool wall such that one end is adjacent to or in contact with the gap. The other end of the conductive member can be directly or indirectly connected to the heat sink. In certain embodiments, the heat pipes transport heat from the wall of the spent fuel pool to the heat sink. In general, the heat pipes use evaporation and condensation of an intermediate fluid to produce very high thermal conductance.

In certain embodiments, the valve is employed to activate and deactivate the highly conductive members. During normal operation, e.g., when the active spent fuel pool cooling system is available and operable, the valve is positioned to prevent water flow and deactivate the highly conductive members in order to inhibit the transport of heat from the spent fuel pool to the heat sink. However, upon the loss of normal pool cooling, the valve is positioned to allow water flow and activate the highly conductive members in order to allow heat to be removed from the spent fuel pool and transported to the heat sink.

Figure 2:
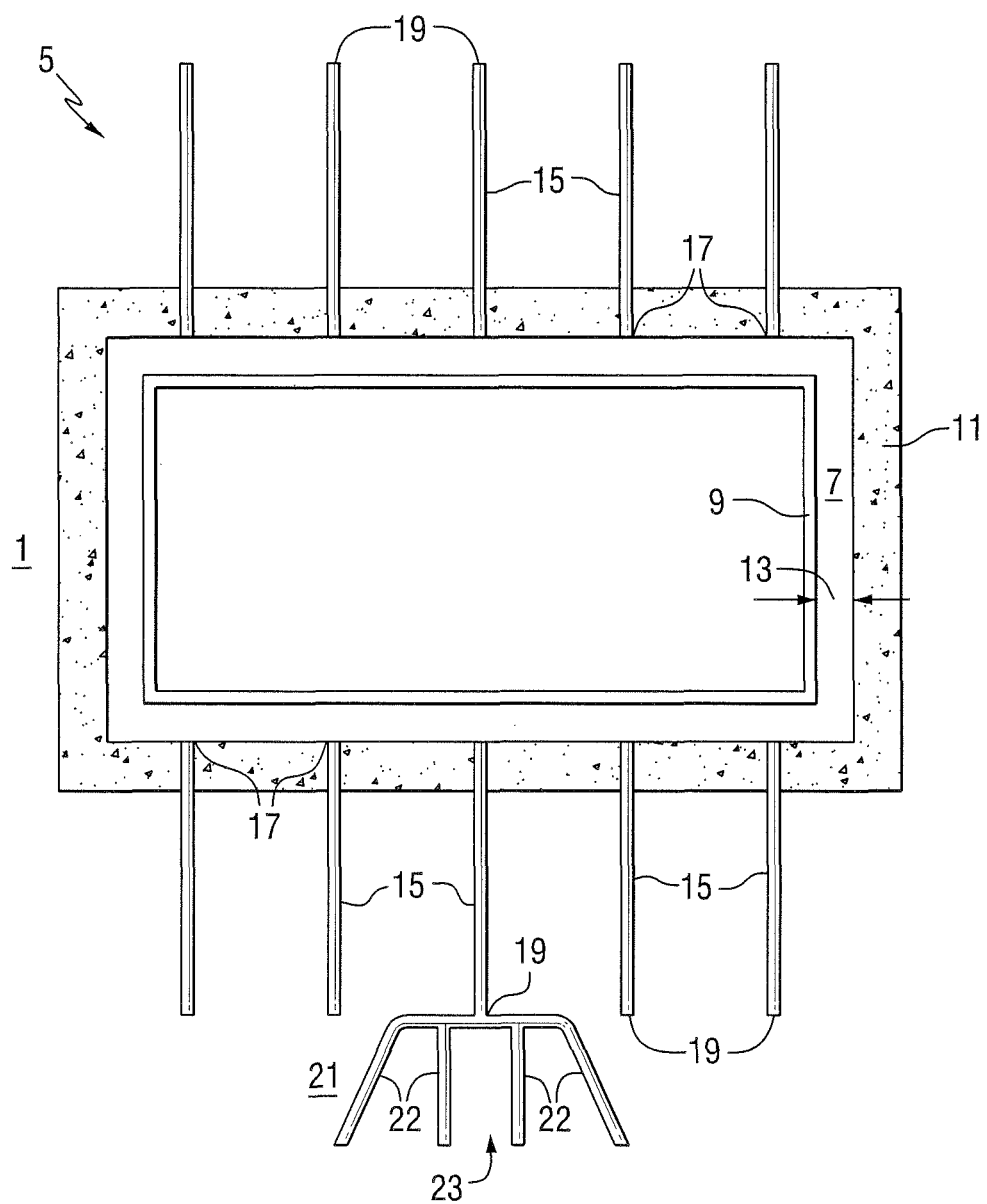
FIG. 2 shows a top view of a passive spent fuel pool cooling system in accordance with certain embodiments of the invention.

FIG. 2 shows a top view of an alternate passive spent fuel pool cooling system 1 in accordance with certain embodiments of the invention. The system 1 includes a spent fuel pool 5' and a gap 7 formed along the periphery of the spent fuel pool 5'. The gap 7 is formed by an inner wall 9, e.g., liner, of the spent fuel pool 5' and an outer wall 11, e.g., secondary concrete wall, of the spent fuel pool. The width 13 of the gap 7 and its depth (not shown) can vary. Further, shown in FIG. 2 is a plurality of heat pipes 15 each having a first end 17 and a second end 19. The first end 17 is connected to the outer wall 11 and the second end 19 is connected to a heat sink 23. In certain embodiments, the second end 19 can be connected to a heat distributor 21. The heat distributor 21 includes an array of metallic, conductive cooling fins 22 with a large surface area that is able to distribute heat from the concentrated locations at the second end 19 of the plurality of heat pipes 15 to a larger area in the heat sink 23. FIG. 2 shows only one second end 19 connected to a heat distributor 21, however, in certain embodiments, more than one second end 19 can be connected to a heat distributor 21. For example, in certain embodiments, each and every second end 19 of the plurality of heat pipes 15 is connected to a heat distributor 21. Further, FIG. 2 shows four cooling fins 22, however, in certain embodiments, the number of cooling fins 22 may be more or less than four. Furthermore, in certain embodiments, the cooling fins 22 can be replaced with another structure suitable for distributing heat from concentrated locations. As above-mentioned, the gap 7 is filled with air during normal operation and with water during an event, such as station blackout. During an event, heat is conducted from the spent fuel pool 5', across the gap 7, into the first end 17, through the heat pipes 15, out of the second end 19, and into the heat sink 23.

Figure 3:
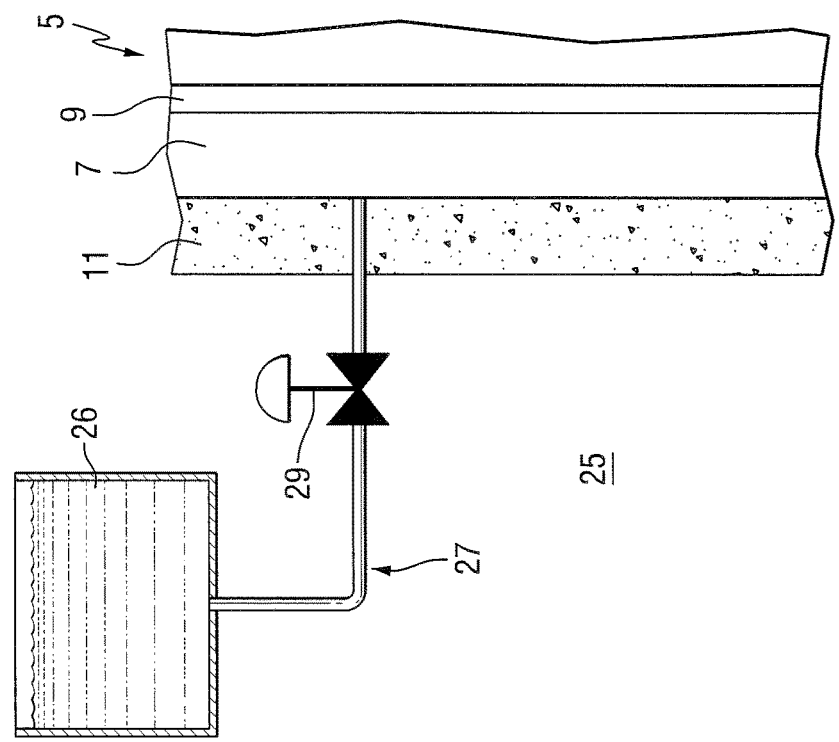
FIG. 3 shows, schematically, a water supply system during normal operation for the passive spent fuel pool cooling system shown in FIG. 2 in accordance with certain embodiments of the invention.

FIG. 3 shows a water supply system 25' during normal operation for controlling the flow of water into the gap 7 (shown in FIG. 2) in accordance with certain embodiments of the invention. FIG. 3 shows gap 7 filled with air (not shown) and a header 27 located near or at the top of the gap 7. The header 27 is filled with water (not shown) which is supplied from a water tank 26 connected to the header 27. Positioned within the header 27 is a solenoid valve 29 which is supplied with site power to stay energized and closed during normal operation.

Figure 4:
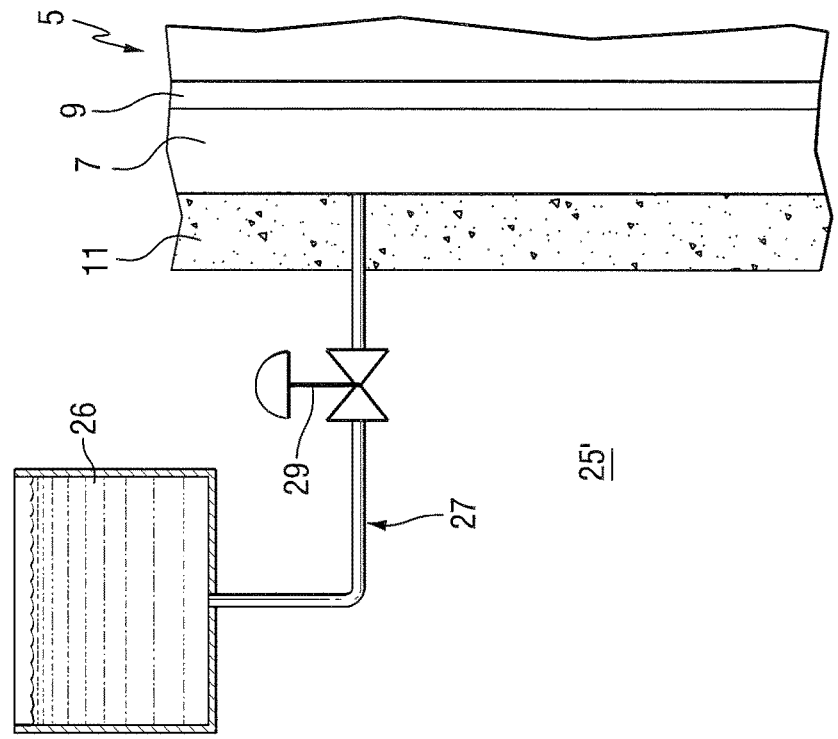
FIG. 4 shows, schematically, a water supply system during a loss of power event for the passive spent fuel pool cooling system shown in FIG. 2, in accordance with certain embodiments of the invention.

FIG. 4 shows a water supply system 25" during a loss of onsite and offsite power event, e.g., station blackout, for controlling the flow of water into the gap 7 (shown in FIG. 2) in accordance with certain embodiments of the invention. FIG. 4 shows gap 7, header 27, water tank 26 and solenoid valve 29 as shown in FIG. 3. However, in FIG. 3 during normal operation, the gap 7 contains air and the solenoid valve 29 is closed to prevent the flow of water into the gap and in FIG. 4 during a loss of power event, the solenoid valve 29 is open to allow water to flow from the water tank 26, through the header 27 and into the gap 7. Since water is significantly more conductive than air, the heat is conducted across the gap 7 to the heat pipes 15 and the heat distributor 21 (shown in FIG. 2) and subsequently distributed into the heat sink 23 (shown in FIG. 2).

Figure 5:
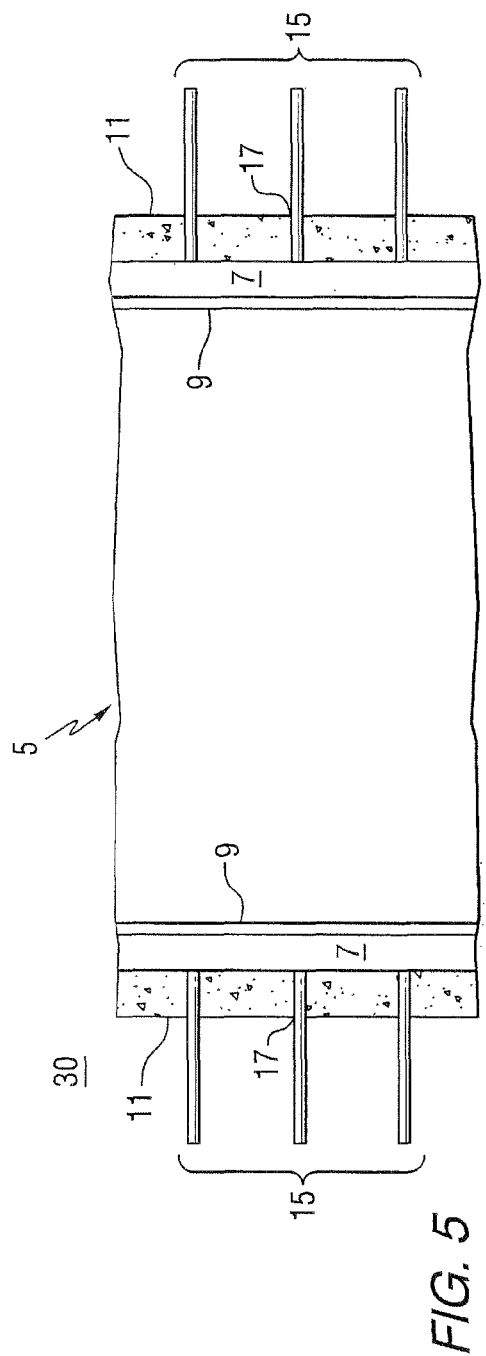
FIG. 5 shows, schematically, a header filled and thermal switch deactivated under normal operating conditions for the spent fuel pool cooling system shown in FIG. 2 in accordance with certain embodiments of the invention.

FIG. 5 shows a section view of the alternate passive spent fuel pool cooling system 1 shown in FIG. 2 including the spent fuel pool 5', gap 7, inner wall 9, outer wall 11, heat pipes 15 and first end 17. In addition, FIG. 5 shows the gap 7 empty of water under normal operating conditions.

Figure 6:
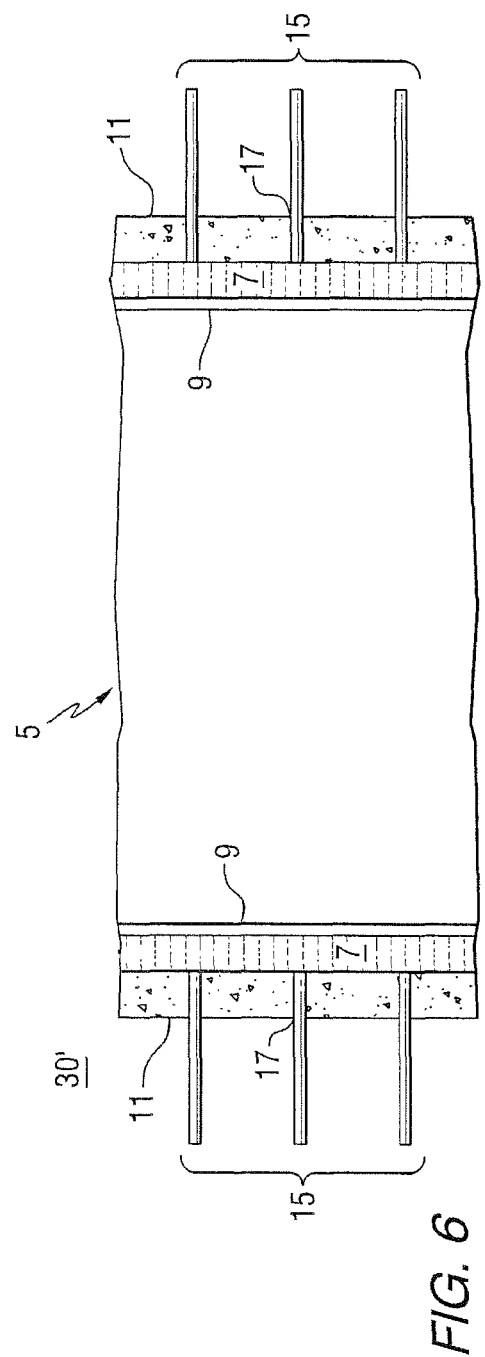
FIG. 6 shows, schematically, a header emptied and thermal switch activated under a loss of power event for the spent fuel pool cooling system shown in FIG. 2 in accordance with certain embodiments of the invention.

FIG. 6 shows a section view of the alternate passive spent fuel pool cooling system 1 shown in FIG. 2 including the spent fuel pool 5, gap 7, inner wall 9, outer wall 11, heat pipes and first end 17. Further, FIG. 6 shows the gap 7 is filled with water (shown shaded) under event conditions, e.g., station blackout, to enable thermal conduction through the heat pipes 15 and into the heat sink 23 (shown in FIG. 2).

While the invention has been described in terms of various specific embodiments, those skilled in the art will recognize that the invention can be practiced with modifications within the spirit and scope of the appended claims.

The invention claimed is:

1. A method of passively cooling a spent fuel pool in a nuclear power plant absent of onsite and offsite power, wherein the spent fuel pool has an inner wall and an outer wall, the method comprising:
    spacing the inner wall and the outer wall of the spent fuel pool a distance apart substantially along a periphery of the spent fuel pool forming a gap,
    wherein, the gap contains air to impede a flow of heat from the spent fuel pool when passive cooling is deactivated;
    providing a heat sink;
    providing one or more conductive members having a first end and a second end;
    connecting the first end of the one or more conductive members to the gap and the second end to the heat sink; and
    activating passive cooling of the spent fuel pool, comprising:
        adding water to substantially fill the gap;
        conducting heat generated from the spent fuel pool through the gap; and
        transporting the heat from the gap through the one or more conductive members to the heat sink.

2. The method of claim 1, wherein adding water to substantially fill the gap, comprises:
    obtaining a water source;
    connecting a discharge header to the water source;
    discharging water from the water source into the discharge header; and
    discharging the water from the discharge header into the gap.

3. The method of claim 2, further comprising installing in the discharge header a flow control valve having an open position and a closed position.

4. The method of claim 2, further comprising locating the discharge header at the top or near the top of the gap.

5. The method of claim 1, further comprising partitioning the gap into a plurality of channels.

6. The method of claim 5, further comprising installing in each of said plurality of channels a discharge header.

* * * * *